Patented Nov. 8, 1949

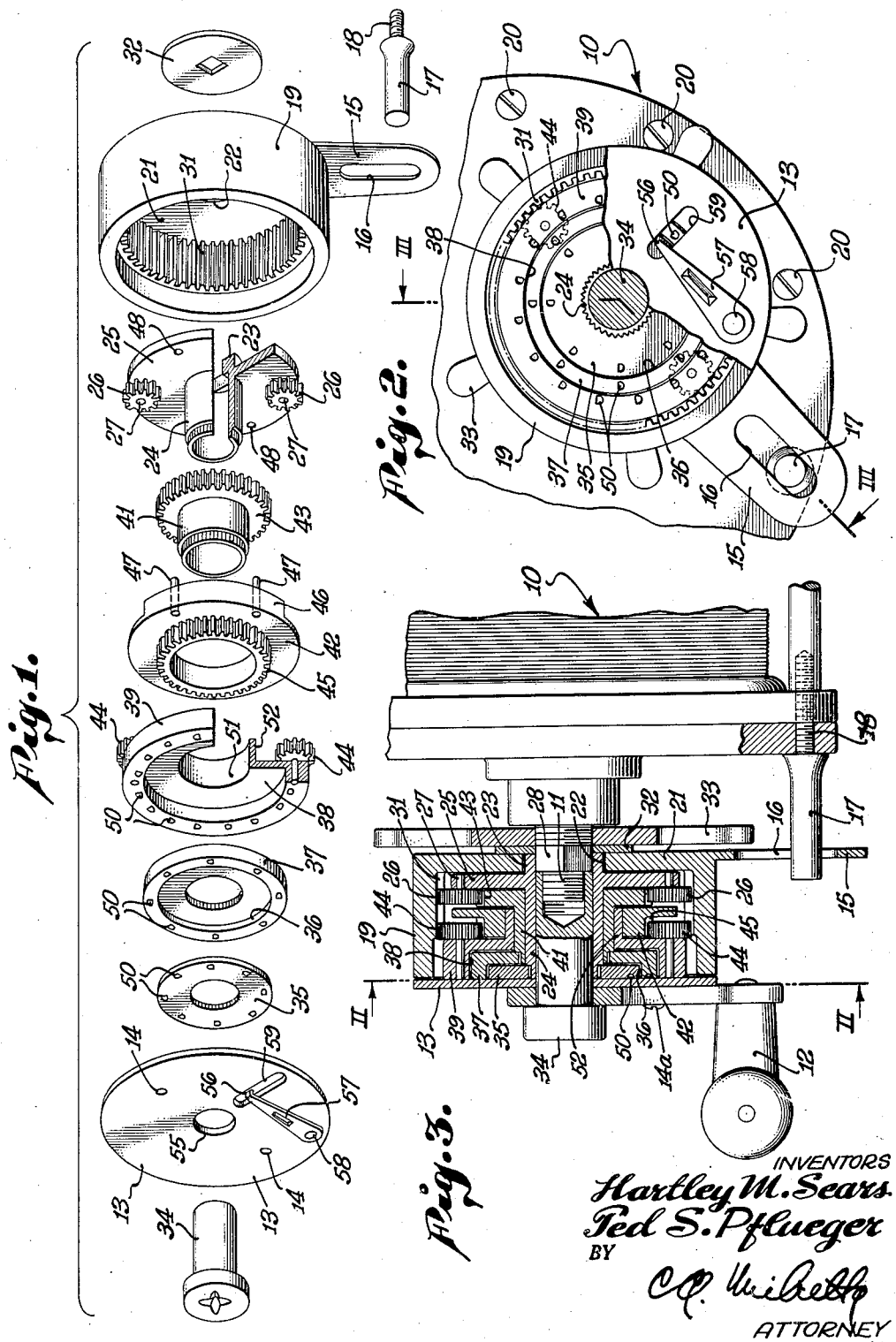

2,487,387

UNITED STATES PATENT OFFICE 2,487,387

TRANSMISSION FOR FISHING REELS

Hartley M. Sears, Pasadena, and Ted S. Pflueger, Altadena, Calif.

Application March 11, 1947, Serial No. 733,772

17 Claims. (Cl. 74—750)

This invention relates to fishing reels and more particularly but not necessarily to an attachment for a fishing reel for selectively varying the speed of the crank relative to the speed of the spool or shaft of the reel.

On many occasions, while fishing either in salt or fresh water, a fisherman is confronted with a situation in which the speed at which a line is being reeled in must be changed rapidly. A game fish hooked on the line may change direction and make a run directly at the fisherman, thereby requiring that the line be very rapidly reeled in in order to take up slack. Various and sundry types of mechanisms have heretofore been provided for changing the ratio of the speed of the crank or handle of a fishing reel with the speed of the spool, some of which are gear shifts and other hydraulic or otherwise operated. Such constructions are at the expense of the strength of the reel and do not operate with the smoothness required by a skilled operator. Moreover, prior construction involved changes in the body of the reel, were bulky, heavy, and expensive, and in most instances the advantageous features of standard reels were lost by the inclusion of speed changing arrangements. It is therefore a primary object of this invention to provide a speed changing attachment for a fishing reel that may be installed on any conventional reel of standard type.

Another object is to provide a speed changing attachment of the geared type wherein different ratios of speed may be selectively obtained without disturbing the mesh of the gears.

Another object is to provide a novel transmission which may be readily attached to the shaft of a conventional fishing reel and which will provide a plurality of different speeds between the crank of the reel and the shaft of the reel.

An object of the invention, also, is to provide a transmission for fishing reels, which transmission does not alter or interfere with the drag or friction clutch usually carried by such reels.

Another object is to provide a speed changing attachment for fishing reels that may be selectively operated by a manually actuated lever.

A further object is to provide an attachment having the above characteristics that will be compact, rugged, efficient in operation and comparatively cheap to manufacture.

The above and other objects will be made apparent throughout the further description of the invention when taken in connection with the accompanying drawings wherein like reference characters refer to like parts. It is to be distinctly understood that the drawings are not a definition of the invention but merely illustrate and describe one form by means of which the invention may be effectuated.

In the drawings:

Fig. 1 is an exploded view of an attachment embodying the invention.

Fig. 2 is a partial end elevational view of a reel broken away in order to show certain details of the invention taken along the line II—II of Fig. 3.

Fig. 3 is a vertical sectional view of the attachment shown mounted on the shaft of a reel taken along the line III—III of Fig. 2.

Referring to the drawings, a fishing reel represented in its entirety by 10 is shown with the present device mounted on the conventional shaft 11 from which the crank or handle 12 has been removed. The present device has been designed so that the conventional handle 12 may be retained since the handle on some types of reels is attractive and expensive. The present device includes a revolving plate or head 13 which could be provided with an integral crank, or as shown, be arranged to support the conventional crank. The latter may be attached to the head 13 by any suitable means such as threaded openings 14 here shown adapted to receive screws 14a positioned in corresponding openings in the handle 12.

The head 13 is a flat circular plate which is arranged to turn adjacent the peripheral edge of a cylindrical housing 19. The housing 19 is held stationary relative to the reel 10 by means of a projection or lug 15 having an elongated slot 16 for receiving a stud 17. The stud 17 has a threaded portion 18 which may be substituted for one of the reel retaining screws 20. The slot 16 is elongated for the purpose of adjustment when the attachment is used on reels of different diameters.

The housing 19 has a closed bottom 21 with a central opening 22 which receives the lower end 23 of a tubular member 24 provided with an integral flange 25. The end 23 is provided with a square opening for receiving the square portion 28 of the shaft 11. The flange 25 of the tubular member 24 is circular and carries thereon a pair of planetary gears 26 diametrically oppositely disposed on the upper face of the flange 25. The gears 26 are rotatably mounted on stub shafts 27 positioned adjacent the edge of the flange so that the gear teeth will extend outwardly from the edge of the flange and mesh with an internal gear 31 formed in the stationary housing 19. A washer 32 may be inserted on the shaft between the bottom 21 of the housing 19 and a conventional drag 33 of the reel 10, said washer bearing against circular shoulder of squared portion 28 of shaft 11, so as not to bind action of drag 33.

The outer threaded end of the shaft 11, from which the crank nut has been removed, is used to receive an internally threaded bolt 34 which extends through the center of the device and holds the several parts in assembled relation.

The tubular shaft 24 is externally splined at its outer end for receiving complementary splines of an internally splined disc 35. The disc 35 is rotatably nested in a recess 36 of a disc 37, the latter being rotatably nested in a recess 38 of a disc 39.

The shaft 24 extends through a tubular sleeve 41, gear member 42, disc 39, disc 37 and connects with complementary spline of disc 35. The sleeve 41 carries a low speed sun gear 43 on its inner ends which meshes with planetary gears 26. The outer end of sleeve 41 is splined and extends through gear member 42, disc 39 and connects with complementary internal splines of disc 37. The inner face of disc 39 carries a pair of diametrically oppositely disposed planetary gears 44. The high speed sun gears 44 mesh with a gear 45 carried by member 42 and with internal gear 31. The member 42 is spaced from flange 25 by spacer members 46 a sufficient distance to accommodate gear 43. The member 42 is fixed to the flange 25 by means of stud or screw 47 which extends into opening 48 in the flange 25. The disc 39 is provided with a central opening 51 having a tubular flange 52 for receiving the sleeve 41 and spacing the disc 39 from member 42 a sufficient distance to accommodate the gears 44.

The bolt 34 extends through an opening 55 in the head 13 and through the tubular shaft 24 and is threaded onto the shaft 11. Each of the discs 35, 37 and 39 is provided with a plurality of radially disposed spaced openings or recesses 50 on their upper faces for selective engagement with a prong 56 provided on the end of a lever 57. The lever 57 is pivoted on the head 13 as shown at 58. The prong 56 extends through an elongated slot 59 provided in the head 13 and is arranged to be manually moved for selective engagement with the openings 50 in the discs 35, 37 or 39. The discs 35, 37 and 39 are nested in one another and their upper faces lie in the same plane.

The present device provides three different speed ratios between the crank 12 and the shaft 11. When a direct drive between the crank 12 and shaft 11 is desired, the operator moves the lever 57 to engage the prong 56 with one of the openings 50 in the disc 35, the latter being connected to the splined end of shaft 24. Since the shaft 24 is fixedly mounted on the square portion 28 of shaft 11, the shaft 11 will rotate in unison with the head 13 in response to turning the head 13 by the crank 12. When it is desired to rotate the shaft 11 slower than the crank 12, the operator moves the lever 57 to engage the prong 56 in one of the openings 50 in the disc 37, the latter being spline connected to the end of sleeve 41. The shaft 11 will now be rotated by way of gear 43 and planetary gears 26, the latter meshing with the stationary internal gear 31. When it is desired to increase the speed of the shaft 11 relative to the crank 12 the operator moves the lever 57 to engage the prong 56 in one of the openings 50 in the disc 39 at which time the shaft 11 will be rotated by way of disc 39, planetary gears 44 which mesh with gear 45 and the internal gear 31, gear member 42, studs 47 and flange 25, the latter being fixedly mounted on shaft 11 by means of the square opening in portion 23 and the complementary portion 28 of shaft 11.

Accordingly there is provided a transmission that may be attached to the shaft of a conventional fishing reel that will provide different speed ratios between the crank and the shaft without disturbing the mesh of the gears. The attachment is compact, durable and may be readily and easily operated to provide the desired speed of the spool of a fishing reel. It will be noted that by reason of the inter-nested sleeve and spline assembly an extremely compact transmission has been provided. The outer diameter of cylindrical housing 19 is smaller than the diameter of star drag 33. The entire unit is readily attached by the bolt 34. Speed changes are attained by moving the readily accessible lever 57 and its prong 56, and the prong 56 moves in a single plane toward and away from the axis of rotation of the entire assembly. While the present device has been illustrated and described as an attachment for a fishing reel it will be obvious that the device may be built into the reel as standard equipment. Other changes, substitutions, additions and modifications may be made in the device without departing from the spirit and scope of the invention as defined by the appended claims.

We claim:

1. A transmission for a fishing reel having a shaft comprising a housing fixed relative to said reel, an internal gear carried by said housing, a plurality of sets of planetary gears, a separate sun gear meshing with each of said sets of planetary gears, and selective means for causing one of said sun gears to drive one set of said planetary gears or causing another set of planetary gears to drive another one of said sun gears, the said means including a plurality of actuating means for selectively actuating said planetary gears and said sun gears.

2. In a transmission attachment for a fishing reel having a drive shaft, a crank, a transmission means connecting said crank with said shaft, said transmission means including a stationary housing provided with a fixed internal gear and a plurality of sets of planetary gears in the housing, each set having a separate sun gear, said planetary gears meshing with the common fixed internal gear, all of said gears being disposed within the housing, and manually operated means for transmitting rotation of the crank to a selected set of planetary gears and sun gear to provide different speed ratios between crank and shaft.

3. A transmission attachment of the character stated in claim 2, including: a separate driving disc for each of the sets of planetary gears and a further driving disc for one of said sun gears, said manually operable means being arranged to selectively engage a desired driving disc.

4. A transmission attachment of the character stated in claim 2, including: a separate driving disc for each of the sets of planetary gears and a further driving disc for one of said sun gears, all of said driving discs being arranged in nested, coaxial relation with portions in a common plane transverse to their axis of rotation, said manually operable means including a member movable along said common plane to selectively engage a desired driving disc.

5. A transmission attachment for use on a fishing reel provided with a main drive shaft, comprising: a cylindrical housing provided with means for fixedly connecting it to a reel, said housing being adapted to axially receive one end of the main drive shaft; an internal gear carried by the housing; a flanged member provided with a set of planetary gears in engagement with the internal gear, said flanged member being connected to the main drive shaft, and a driving disc carried by said flanged member; a sleeve provided with a different driving disc and a sun gear in engagement with the set of planetary gears; a separate set of planetary gears carried by a further driving disc; a second sun gear operably carried by the flanged member, said separate set of planetary gears being in engagement with said second sun gear and the internal gear; and means including a crank for selectively imparting rotation to a desired driving disc to vary the speed of rotation of the main drive shaft.

6. A transmission attachment of the character stated in claim 5, wherein the three driving discs are in nested, separately rotatable relation, and include portions lying in a common plane, said portions being selectively engageable to impart rotation to a desired driving disc.

7. A transmission for a fishing reel having a shaft comprising: a crank, transmission means connecting said crank with said shaft, said transmission means including a housing having an internal gear therein and fixed thereto and a plurality of sets of planetary gears, each set having a sun gear, all of the said gears being disposed in said housing with the said planetary gears meshing with said internal gear, and separate means for selectively connecting said crank with a desired set of sun and planetary gears for providing different speed ratios between the said crank and said shaft.

8. A transmission in accordance with claim 7, wherein the said separate means includes a plurality of discs arranged in nested relation and turnable relative to each other.

9. A compact transmission comprising: a crank, a stationary housing, an internal gear fixed to and carried by said housing, a plurality of sets of planetary gears, a sun gear meshing with each of said sets of planetary gears, manually operated means for causing one of said sun gears to drive one set of said planetary gears and manually operated means for causing another set of said planetary gears to drive another one of said sun gears.

10. A transmission in accordance with claim 9 wherein a plurality of actuating means are provided for selectively actuating said planetary gears and said sun gears.

11. A transmission in accordance with claim 9 wherein the said sets of planetary gears mesh with internal gear carried by the said housing.

12. A shaft, a transmission for attachment to said shaft, said transmission being mounted on said shaft and comprising: a stationary housing having an internal gear therein and fixed thereto, a plurality of sets of sun and planetary gears disposed in said housing and having the said planetary gears meshing with said internal gear, and manually operated means including a crank for selectively driving the said sets of sun and planetary gears whereby to provide different speed ratios between the said shaft and said crank.

13. A transmission in accordance with claim 12 wherein means are provided for connecting the said crank with said shaft to provide a 1:1 speed ratio between said crank and said shaft.

14. A shaft, a transmission for said shaft, said transmission comprising: a crank; a stationary housing; an internal gear carried by said housing; a plurality of sets of sun and planetary gears disposed in said housing with said planetary gears meshing with said internal gear; and manually operated means for selectively causing the planetary gears of one set to drive its associated sun gear or causing the sun gear of another set to drive its associated planetary gears whereby to provide different speed ratios between said crank and said shaft.

15. A transmission comprising: a crank, a transmission attachment mounted on said shaft, said attachment including a stationary housing, an internal gear within said housing and fixed relative thereto, a plurality of sets of sun and planetary gears disposed in said housing, said planetary gears meshing with said internal gear, and means including a plurality of discs for selectively driving a desired set of sun and planetary gears, whereby to provide different speed ratios between the said shaft and the said crank.

16. A transmission in accordance with claim 15, wherein manual means is provided for selectively connecting said crank with said discs.

17. A transmission for attachment to driven mechanism having a shaft, said transmission being adapted to be mounted on said shaft and comprising a housing fixed against rotation relative to said mechanism, said housing having an internal gear therein and fixed thereto, a plurality of sets of sun and planetary gears disposed in said housing and having the said planetary gears meshing with said internal gear and manually operated means including a crank for selectively driving the said sets of sun and planetary gears whereby to provide different speed ratios between the said shaft and said crank.

HARTLEY M. SEARS.
TED S. PFLUEGER.

REFERENCES CITED

The following references are of record in the file of this patent:

UNITED STATES PATENTS

| Number | Name | Date |
|---|---|---|
| 986,588 | O'Kelley | Mar. 14, 1911 |
| 1,256,372 | Rowledge | Feb. 12, 1918 |
| 1,695,214 | Sorensen | Dec. 11, 1928 |
| 2,011,998 | Clark | Aug. 20, 1935 |
| 2,327,740 | Pfister | Aug. 24, 1943 |
| 2,406,156 | Nardone | Aug. 20, 1946 |
| 2,417,732 | Bland et al. | Mar. 18, 1947 |